April 27, 1965　　　　E. BAJARS　　　　3,181,065

D'ARSONVAL METER MOVEMENT

Filed May 21, 1963

INVENTOR.
Eric Bajars
BY Ooms, McDougall & Hersh
Att'ys

United States Patent Office 3,181,065
Patented Apr. 27, 1965

3,181,065
D'ARSONVAL METER MOVEMENT
Eric Bajars, Elmhurst, Ill., assignor to American Gage & Machine Company, Chicago, Ill., a corporation of Illinois
Filed May 21, 1963, Ser. No. 282,049
4 Claims. (Cl. 324—150)

This invention relates to meter movements of the D'Arsonval moving-coil type and is particularly addressed to an improved construction for such movements which permits a large deflection angle and at the same time achieves sensitivity and self-shielding in a measure not attainable with prior designs.

One object of the present invention is to provide a wide-angle meter movement, capable of deflection angles exceeding 270°, that is structurally compact, mechanically rugged, and readily assembled.

Another object of the invention is to provide a D'Arsonval movement wherein the magnetic circuit is so designed as to derive useful deflection torque from virtually the entire wire length of the coil, thus providing greatly improved sensitivity.

Still another object of the invention is to provide a D'Arsonval movement wherein the magnetic circuit is almost entirely self-enclosed, resulting in a degree of self-shielding that is far superior to that provided by prior designs.

A still further object of the invention is to provide a D'Arsonval movement, having the desirable characteristics already noted, which may readily be employed with any of the commonly used types of coil suspensions, including both the jeweled-pivot and the taut-band types.

Other objects and advantages of the invention will be apparent from the following detailed description of typical embodiments thereof.

Figure 1:
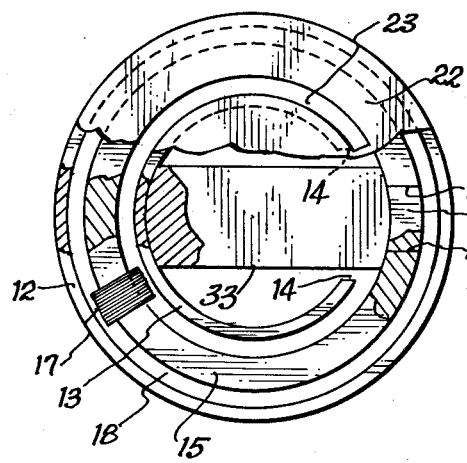
Figure 2:
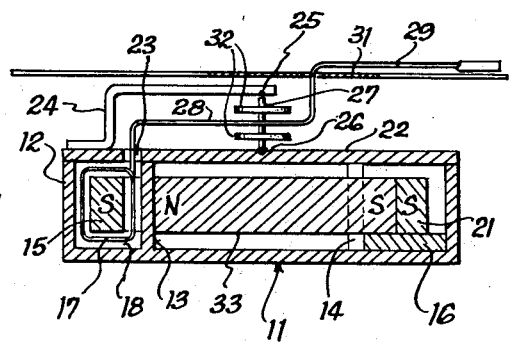
Figure 3:
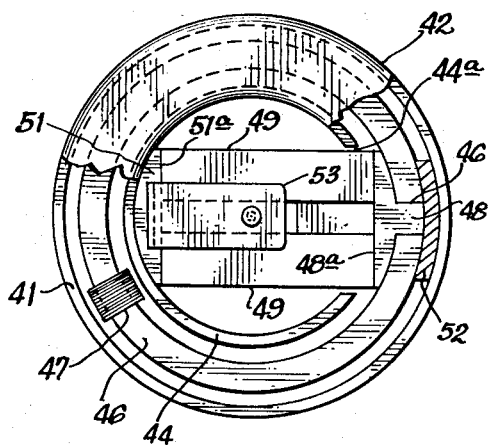
Figure 4:
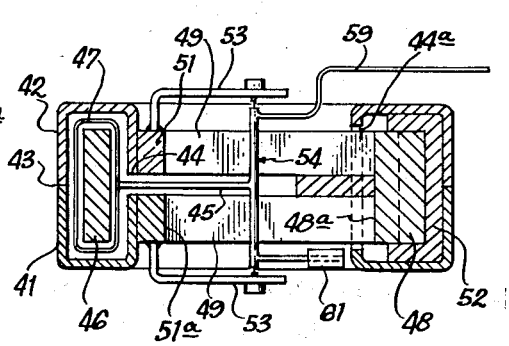

In the appended drawing, FIG. 1 shows a simplified plan view, partly in section, of a meter movement embodying my invention. FIG. 2 is a view in radial section of the FIG. 1 embodiment, again somewhat diagrammatic to bring out clearly the novel structural features which characterize my new design. FIG. 3 is a plan view, partially cut away, showing another embodiment of my invention. FIG. 4 is a view in radial section of the FIG. 3 embodiment, again somewhat diagrammatic but showing in detail the structural features which distinguish my invention from previously known movements of the D'Arsonval type.

For illustrative purposes, the embodiment of my invention shown in FIGS. 1 and 2 is portrayed as having a coil suspension of the jeweled-pivot type, while the embodiment of FIGS. 3 and 4 is illustrated with a taut-band coil suspension. It should be understood, however, that the details of the coil suspension do not form a part of my invention, per se, and any convenient type of coil suspension may therefore be used.

Referring now to FIGS. 1 and 2, I show therein an outer pole-piece member 11, of magnetically permeable material, which is formed in the shape of a shallow cup having a cylindrical outer side wall 12 and a cylindrical inner wall 13 disposed concentrically of outer wall 12. The inner wall 13 is relieved throughout a few degrees of arc to provide an access opening 14, the purpose of which will be noted in a later paragraph.

As may readily be seen from FIGS. 1 and 2, the concentric walls 12 and 13, together with the bottom wall of outer pole-piece member 11, define an arcuate trough extending around perhaps 300° of arc. Disposed within this trough is a generally ring-shaped inner pole-piece member 15, of magnetically permeable material, member 15 being so dimensioned as to occupy a space midway between the inner wall 13 and outer wall 12 of member 11.

Inner pole-piece member 15 is secured in the position shown in FIG. 2 by resting on a spacer element 16 of nonmagnetic material, the assembly being rigidly held together by soldering, cementing, or other suitable means. The spacer member 16 holds the inner pole piece 15 spaced away from the bottom of outer pole piece 11, as indicated in FIG. 2; in consequence, the two pole-piece members 11 and 15 define an elongated arcuate air gap 18 of essentially symmetrical cross section, extending throughout the length of the trough defined by walls 12 and 13 of outer pole piece 11.

Surrounding the inner pole-piece member 15 is a coil 17 of the general type commonly used in D'Arsonval movements, comprising many turns of fine wire wound on a suitable coil form. The dimensions of coil 17 are so proportioned as to enable it to move freely within the arcuate air gap 18 without directly engaging either of the two pole pieces.

To provide a convenient means for threading the inner pole piece 15 through the coil 17 during the assembly of the instrument, the ring conformation of inner pole piece 15 is interrupted at 19, the gap thus created being of sufficient length to admit the coil 17. After the coil 17 has thus been received in position on the pole piece 15, the gap in the pole piece may be filled in by insertion of a plug 21 of magnetically permeable material, this plug being shaped and dimensioned to fit snugly between the end walls 19 of the relieved portion of pole piece 15. Plug 21 is secured in place by soldering, cementing, or other suitable means.

Overlying outer pole piece 11 and forming a part of it, magnetically speaking, is a cover member 22 of magnetically permeable material, disc-shaped and proportioned to abut intimately the upper surfaces of walls 12 and 13 throughout their length. Cover member 22 is relieved to form an arcuate slot 23 disposed radially outward of wall 13 and extending through an arc substantially equal to, or even greater than, the arc defined by inner wall 13. While the width of this slot 23 is not critical, it is preferably just wide enough to provide adequate clearance for the coil-suspension means presently to be described. As shown in FIGS. 1 and 2, its width is equal to the lateral spacing between wall 13 and inner pole piece 15.

Rigidly secured to the upper face of cover member 22 is a bracket or bridge member 24, which extends laterally over the central portion of cover member 22 and serves as a carrier for a jewel bearing 25, situated on the axis of symmetry of the pole-piece assembly. Directly below bearing 25 is a companion bearing 26, carried by cover member 22, these bearings cooperating to provide a pivotal mount for a spindle 27.

Secured to spindle 27 is a suspension arm 28 which passes through slot 23 and is joined at its lower end to the coil 17. Arm 28 is extended beyond the spindle 27 and bent upward and radially outward to form an indicating pointer 29, adapted to cooperate with a conventional indicating dial 31. Skilled readers will recognize this type of coil suspension as per se conventional in moving-coil instruments.

It should be understood, with respect to both embodiments of my invention herein disclosed, that the means for biasing the coil suspension in the desired rest position, providing return torque therefor, and bringing out the electrical leads from the moving coil for external circuit connections thereto, may be conventional and do not, per se, form a part of the present invention. For that reason, the specific structure relating to these conventional functions is not shown in the drawing, apart from the conventional representation of hair springs shown at 32 in FIG. 2.

Mounted diametrically within the instrument assembly, and passing through the opening 14, is a permanent magnet 33 of bar conformation, the ends of which, however, are arcuately shaped for intimate abutment, respectively, with the inner face of wall 13 and the inner face of pole piece 15. Magnet 33, which may be secured in position by soldering, cementing, or other suitable means, operates to magnetize the pole pieces 11 and 15, thus creating a magnetic field in the air gap 18.

In operation, the meter movement of FIGS. 1 and 2, as described in the foregoing paragraphs, exhibits these striking advantages:

(1) The available deflection angle can approach 300°.

(2) For any given magnet strength and coil design, the deflection sensitivity is exceptionally great.

(3) The movement is almost perfectly self-shielded, and in consequence is essentially immune to the influence of external magnetic fields.

The high deflection sensitivity of my movement is due, I believe, primarily to the fact that in my novel construction the current-produced magnetic field around the coil interacts with the permanent-magnet field throughout practically the entire wire length of the coil; i.e., nearly the entire corcumference of the coil traverses the field generated by the permanent magnet. As a result, a given coil current will produce a much greater deflecting torque in my instrument than in a conventional wide-angle movement.

My structural design wherein the outer pole piece almost completely surrounds the inner pole piece is also responsible for the superior self-shielding characteristics of my instrument. This feature permits my instrument to be housed in a light-weight casing of plastic or non-magnetic metal, even in applications where it will be exposed to ambient magnetic fields.

In FIGS. 3 and 4, I have illustrated another embodiment of my invention, particularly well adapted to taut-band coil suspension. In this embodiment, the outer pole piece is formed of two essentially symmetrical ring-shaped members of magnetically permeable material, respectively designated 41 and 42. As may be best seen in FIG. 4, these members mate on their inner faces at 43 to produce a doughnut-shaped outer pole-piece assembly. The inner walls of both elements 41 and 42, however, terminate slightly short of the mating plane 43, to define an elongated circumferential slot 44 extending around the inner circumference of the outer pole-piece assembly and affording passage for the coil suspension arm 45.

In a narrow zone encompassing perhaps 45°, the inner walls of pole-piece elements 41 and 42 are further relieved to define a widened slot 44a, which provides passage for the permanent-magnet assembly presently to be described.

The inner pole piece in the embodiment of FIGS. 3 and 4 is a ring-shaped element 46 of magnetically permeable material, relieved in a narrow zone at 46a to permit insertion thereover of the coil 47 during the assembly procedure. After insertion of coil 47 over the inner pole piece 46, the zone 46a is closed off by an insert 48 of magnetically permeable material, which completes the ring structure of the inner pole piece and provides on its planar inner face 48a an abutting surface for cooperation with the permanent-magnet assembly. In the embodiment illustrated, this assembly consists of four bar magets 49 mounted in parallel, abutting planar surface 48a of insert member 48 at one end and abutting at their other ends the planar surfaces 51a of magnetically permeable coupling members 51, the other faces of which are arcuate and dimensioned for intimate abutment with the inner walls respectively of outer pole-piece members 41 and 42. Elements 41, 42, 51, 48, and the permanent magnets 49 may be secured together by soldering, cementing, or other suitable means.

To afford added mechanical strength to the assembly, I prefer to use a spacer member 52 of non-magnetic material interposed between the inner and outer pole pieces, directly behind the plug insert 48. If sufficient mechanical stability is given the assembly by the solder or cement junctions between the pole pieces and the permanent magnets, this spacer member 52 may be omitted.

A pair of brackets 53 straddle the axial portion of the movement assembly, being carried by the members 51, and these brackets serve as anchors for a taut-band suspension 54. Suspension 54, through the agency of the laterally extending arm 45, supports the coil 47 in a centered position within the air gap defined by the inner and outer pole pieces; suspension 54 also supports the indicating pointer 59, which cooperates with a suitable calibrated scale element (not shown), which may be generally similar to element 31 of FIG. 2. As is customary in taut-band instruments, a counterweight 61 is provided near the end of suspension 54 opposite the pointer 59.

As previously noted, conventional means for bringing out the external circuit connections to the coil 47 are employed.

The meter movement of FIGS. 3 and 4, as just described, operates in essentially the same manner, and possesses the same distinctive properties, as the form of my invention disclosed in FIGS. 1 and 2. Both embodiments afford a very wide deflection angle, are effectively self-shielded, and have exceptionally high deflection sensitivity.

As skilled readers will readily appreciate, the embodiments of my invention herein illustrated are merely exemplary. For example, while I have shown my deflection coils and core pieces as being substantially rectangular in cross section, they may of course be made circular or given such other cross section as the needs of a particular application may require. Many other departures from the precise structure shown in the drawings may be made without departing from the spirit of my invention. It is accordingly my desire that the scope of the invention be determined primarily with references to the appended claims.

I claim:

1. In a D'Arsonval meter movement, the combination comprising a coil, generally ring-shaped inner pole-piece means of magnetically permeable material threaded through said coil and dimensioned to permit said coil to move freely thereon, outer pole-piece means of magnetically permeable material formed to define a ring-shaped trough dimensioned to receive said coil and said inner pole-piece means, said trough having a bottom wall and concentric side walls spaced to permit said coil to move in an arcuate path therewithin, means mounting said inner pole-piece means in a centered, spaced position within said trough to define therewith an elongated arcuate air gap between said two pole-piece means, and suspension means mounting said coil in said air gap for revolution through a predetermined arc around the axis of said arcuate air gap, said outer pole-piece means being relieved in the inner side wall of said trough portion to provide an opening yielding access to said inner pole-piece means, said assembly including also bar magnet means wholly disposed within the space defined by the contour of the outer pole-piece means and diametrically of said inner pole-piece means, said magnet means passing through said access opening and connecting said inner and outer pole-piece means to magnetize the same and create a magnetic field within said air gap.

2. The meter movement defined in claim 1 wherein said outer pole-piece means is operative substantially to enclose said inner pole-piece means, said magnet means, and said coil, said outer pole-piece means being relieved, however, to define a circumferential arcuate slot, said suspension means passing through said slot, said slot being of sufficient width to provide clearance therefor throughout the arc of revolution of said coil.

3. In a D'Arsonval meter movement, the combination comprising a coil, a generally ring-shaped inner member of magnetically permeable material threaded through said coil and dimensioned to permit said coil to move freely thereon, an outer member of magnetically permeable material formed generally in the shape of a hollow ring and dimensioned to receive within it said coil and said inner member, while leaving clearance therewithin for free movement of said coil in an arcuate path, means mounting said inner member in a centered, spaced position within said outer member to define a generally doughnut-shaped air gap between said members, said outer member being relieved in one portion of its inner wall to define a zone yielding access to said inner member and being relieved in another portion to define an arcuate slot coaxial with said air gap, and suspension means passing through said slot and operative to mount said coil for revolution in said air gap through a predetermined arc around the axis defined by said gap, said assembly including also bar magnet means wholly embraced within the contour of said outer member and disposed diametrically of said inner member, said magnet means passing through said access zone to join together said inner and outer members, magnetizing the same and creating a magnetic field within said air gap.

4. The meter movement defined in claim 3 wherein the mounting means for said inner member includes a nonmagnetic spacer element disposed between the inner and outer members to assist in holding them in fixed relative position.

References Cited by the Examiner

UNITED STATES PATENTS 2,848,662   8/58   Barry et al. _____ 324—150 X

FOREIGN PATENTS 2,119   3/17   Germany.

JOHN F. BURNS, *Primary Examiner.*

JOHN P. WILDMAN, *Examiner.*